US012767570B2

(12) United States Patent
Estridge

(10) Patent No.: US 12,767,570 B2
(45) Date of Patent: Oct. 20, 2026

(54) METHOD AND VESSEL FOR CARBON SEQUESTRATION

(71) Applicant: SEAWEED GENERATION LTD, Falmouth (GB)

(72) Inventor: Patricia Estridge, Falmouth (GB)

(73) Assignee: SEAWEED GENERATION LTD, Falmouth (GB)

( * ) Notice: Subject to any disclaimer, the term of this patent is extended or adjusted under 35 U.S.C. 154(b) by 147 days.

(21) Appl. No.: 18/866,570

(22) PCT Filed: Jun. 1, 2023

(86) PCT No.: PCT/GB2023/051455
§ 371 (c)(1),
(2) Date: Nov. 18, 2024

(87) PCT Pub. No.: WO2023/237857
PCT Pub. Date: Dec. 14, 2023

(65) Prior Publication Data

US 2025/0326668 A1 Oct. 23, 2025

(30) Foreign Application Priority Data

Jun. 10, 2022 (GB) ...................................... 2208514

(51) Int. Cl.
*E02B 15/10* (2006.01)
*C02F 1/20* (2023.01)
(Continued)

(52) U.S. Cl.
CPC ................ *C02F 3/322* (2013.01); *C02F 1/20* (2013.01); *E02B 15/108* (2013.01); *C02F 2103/08* (2013.01); *C02F 2201/009* (2013.01)

(58) Field of Classification Search
CPC ......... B63B 35/32; B09B 1/002; A01D 44/00; B63G 8/001
See application file for complete search history.

(56) References Cited

U.S. PATENT DOCUMENTS

| | | | | |
|---|---|---|---|---|
| 6,357,213 | B1 * | 3/2002 | Dillingham ............ | A01D 44/00 56/8 |
| 11,304,365 | B2 * | 4/2022 | Orvis ..................... | A01D 44/00 |

(Continued)

FOREIGN PATENT DOCUMENTS

| | | |
|---|---|---|
| CN | 216153987 U | 4/2022 |
| KR | 20090010442 U | 10/2009 |

*Primary Examiner* — Tye William Abell
(74) *Attorney, Agent, or Firm* — Jose Cherson Weissbrot

(57) ABSTRACT

A vessel for sequestering carbon includes a cavity associated with a first opening and a second opening. The vessel is configured to perform a first operating mode to collect seaweed into the cavity and a second operating mode to discharge the seaweed collected in the cavity for sequestration. In the first mode of operation, the vessel is moved across the sea surface, such that water and floating seaweed pass into the cavity via the first opening. The second opening is provided with a filter, such that seawater is able to exit the cavity via the filter, but the seaweed is retained by the filter in the cavity. In the second mode of operation, the vessel is submerged to a transition depth at which the collected seaweed is compressed by water pressure to have a density greater than the sea density. The collected seaweed is then discharged from the cavity to sink to the seabed for sequestration.

19 Claims, 6 Drawing Sheets

(51) Int. Cl.

*C02F 3/32* (2023.01)

*C02F 103/08* (2006.01)

(56) References Cited

U.S. PATENT DOCUMENTS

2022/0080480 A1* 3/2022 Gray ...................... A01D 44/00
2024/0239537 A1* 7/2024 von Herzen ............ B65B 13/02

* cited by examiner

Figure 4
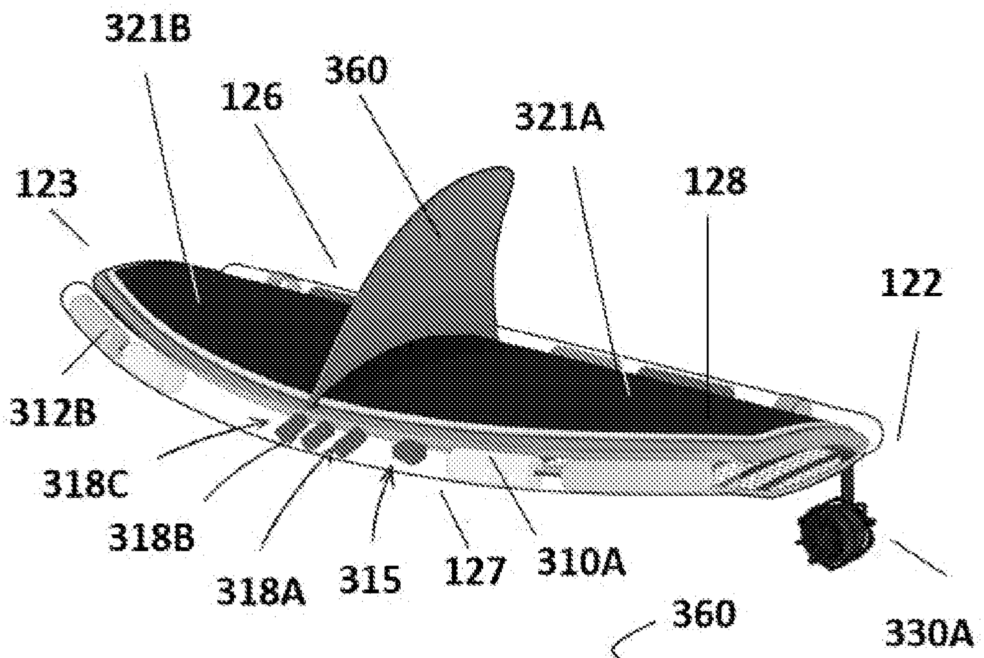
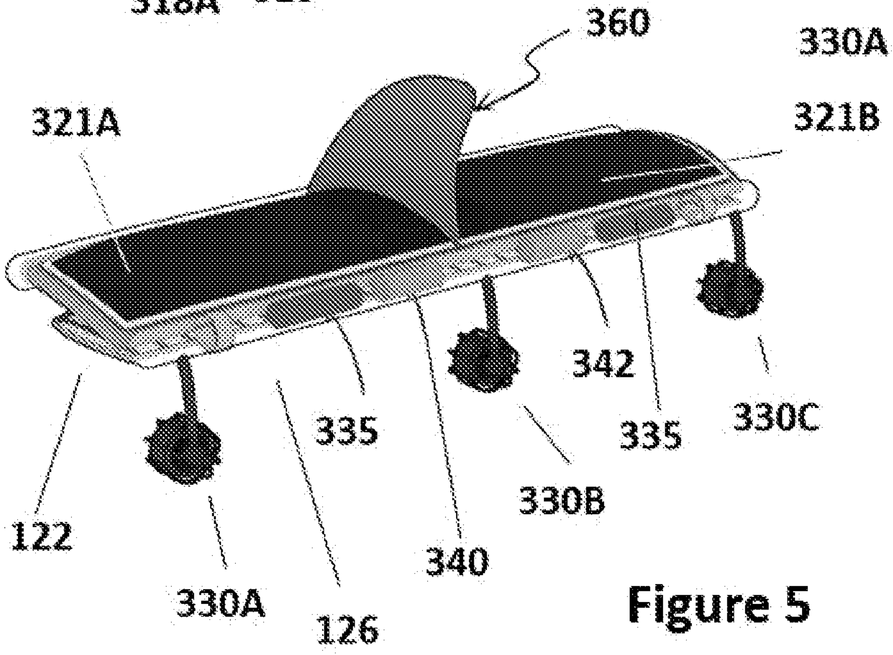
Figure 5

METHOD AND VESSEL FOR CARBON SEQUESTRATION

FIELD

The present application relates to a method and vessel for sequestering carbon to help prevent global warming.

BACKGROUND

The wavelength λ in metres of peak electromagnetic radiation from a black body of temperature T (in Kelvin) is given by $\lambda \approx 0.0029/T$. The sun has a surface temperature of ~5800 K so $\lambda \approx 5\times10^{-7}$ m=500 nm in the wavelength range of visible light. In contrast, the earth has a surface temperature of ~300 K, so $\lambda \approx 1\times10^{5}$ m=10 μm in the infrared region of the electromagnetic spectrum. Carbon dioxide, which is a minor constituent of the earth's atmosphere, is generally transparent at optical wavelengths (and so is invisible to the human eye). Accordingly, carbon dioxide does not inhibit solar radiation from passing through the atmosphere to the surface of the earth. However, carbon dioxide absorbs certain bands in the infrared range. Therefore, as the earth emits infrared (heat) radiation back into space, a proportion of this infrared radiation is absorbed by the carbon dioxide in the atmosphere. This absorption causes the carbon dioxide, and hence also the other components in the earth's atmosphere, to warm up. This increase in temperature caused by transparency to incoming solar radiation, but (partial) absorption for outgoing thermal radiation from the earth, is known as the greenhouse effect.

Plants absorb carbon dioxide from the atmosphere as their main source of carbon, as well as water from the ground, to form carbohydrates in order to grow plant structure and material. The chain of chemical reactions to create carbohydrates from atmospheric carbon dioxide is endothermic. Accordingly, plants generally use chlorophyll to absorb sunlight which then powers a process known as photosynthesis for plant metabolism and growth. The reverse reaction, an oxidation from carbohydrate back to water and carbon dioxide, is exothermic. Animals that eat plants primarily utilise aerobic respiration to perform this oxidation, and hence derive energy such as for movement and warmth.

Some plants may die in anaerobic conditions, such as a peat bog, which can limit decay (oxidation) of the plant material. This material can then become incorporated into geological processes such as sedimentation, subduction, and so on, leading to the production of fossil fuels, for example, oil and coal. On burning (oxidation), these fossil fuels release significant energy as they are converted back into water and carbon dioxide.

The use of fossil fuels has increased very significantly over the past couple of centuries following the industrial revolution, which has led to an anthropogenic rise in the level of carbon dioxide in the atmosphere. Due to the greenhouse effect, the increased amount of carbon dioxide acts to warm the atmosphere in a process known as global warming. This presents a significant challenge for humanity, since global warming may have serious adverse effects, including a rise in sea levels as the polar ice caps melt, and potentially a runaway increase in planetary temperature (which may have happened on the planet Venus). Unfortunately, the amount of carbon dioxide ($CO_2$) that human activity is adding to the atmosphere continues to increase at an unprecedented speed, with annual emissions now totalling 40 gigatonnes of $CO_2$ or equivalent greenhouse gases.

In June 2019, the UK parliament passed legislation defining a 'net zero' target to reduce the net emissions of greenhouse gases by 100% relative to 1990 levels by 2050. One way to address this target is to replace the use of fossil fuels with renewable alternatives such as wind or solar power (or possibly by increased nuclear power). Such actions reduce the amount of carbon dioxide that is generated and then released into the atmosphere.

Another approach to help meet the net zero target is carbon sequestration, in which carbon is stored (sequestered) so that it does not enter the atmosphere as carbon dioxide (or is removed from the atmosphere) and hence does not contribute towards global warning. The Intergovernmental Panel on Climate Change (IPCC) has projected that while urgent and meaningful reductions in our $CO_2$ emissions are essential, 25% of that footprint, i.e. 10 gigatonnes, will need to be offset or removed from the atmosphere to remain below 1.5, or even 2 degrees of warming.

One type of carbon sequestration is associated with buildings, such as coal-fired power stations, that produce a lot of carbon dioxide. It is contemplated that instead of the carbon dioxide being released from such buildings into the atmosphere, rather it is pumped or otherwise saved beneath the earth's surface, for example in some suitable geological formation. However, the implementation of this type of carbon sequestration is challenging from an engineering perspective, and progress has been relatively slow.

Another type of carbon sequestration is based on growing plants, e.g. forests, to absorb and retain carbon dioxide from the atmosphere. This approach is sometimes used in the context of carbon offsets, whereby an activity that adds carbon dioxide to the atmosphere, such as an aeroplane flight using conventional hydrocarbon fuel, e.g. kerosene, is matched (offset) against an activity that removes a corresponding amount of carbon dioxide from the atmosphere, such as growing plants.

It has been recognised in the literature that seaweed (macro algae) may be used for carbon sequestration by sinking the seaweed to the bottom of the sea. The sea may be divided into multiple layers or zones. The top layer is known as the euphotic (sunlight) zone and is home to many familiar species such as tuna fish. This layer extends from the surface down to a depth of around 200 metres. The euphotic zone absorbs (or reflects) nearly all (around 99%) of the sunlight that is incident on the surface of the sea and represents the region in which net photosynthesis may occur. Below the euphotic layer is the mesopelagic (twilight) zone, which extends from around 200 metres down to around 1000 metres and is home to species such as shrimps and swordfish. The light level that penetrates through to the mesopelagic zone is too low to support photosynthesis. Beneath the mesopelagic zone is the aphotic zone, i.e. at a depth of 1000 metres or more, which is home to species such as the giant squid and the angler fish. The aphotic zone is too deep to receive sunlight from the surface and so is shrouded in permanent darkness. Most schemes for performing carbon sequestration at sea involve sinking seaweed to a depth corresponding to the aphotic zone.

The use of seaweed for carbon sequestration is further discussed, inter alia, in: "Tracers in the Sea" by Broecker and Peng, January 1982 (see https://www.amazon.co.uk/Tracers-sea-Wallace-S-Broecker/dp/B0000EHBZ3); "Sequestration of macroalgal carbon: the elephant in the Blue Carbon room" by Krause-Jensen et at, in Biological Letters, 14, 20180236; "Substantial role of macroalgae in marine carbon sequestration" by Krause-Jensen and Duarte, pages 737-742 in Nature Geoscience, volume 9, October 2016; and "Testing the climate intervention potential of ocean afforestation using the Great Atlantic Sargassum Belt" by Bach et al, published on-line in Nature Communications, 7 May 2021, as well as: "Removing 10 Gigatons of Carbon Dioxide" by Tim Flannery, see https://www.youtube.com/watch?v=SRVnitJlr2c.

The use of plants, especially forests, for carbon sequestration has led to commercial arrangements in which a plant grower may sell the carbon offset corresponding to the sequestered carbon to a business which wants to reduce its net carbon emissions. Such a transaction provides a commercial motivation for growers to increase their plant holdings, and a commercial opportunity for a business to reduce its carbon footprint to (or at least towards) net zero.

However, although the provision and use of carbon offsets is now well-established, certain aspects of the implementation remain problematic. For example, there is continued pressure on land-use for many different activities (including agriculture and development), which can increase the price of land available for carbon sequestration. Furthermore, the sequestered carbon of a forest may in reality be released back into atmosphere, for example if the trees fall ill and die, or if the ownership of the forest is subsequently transferred to a new owner who wants to use the land for a different purpose (see "How phantom forests are used for greenwashing", from https://www.bbc.co.uk/news/science-environment-61300708).

SUMMARY

The invention is defined by the appended claims.

A vessel for sequestering carbon includes a cavity having a first opening and a second opening. The vessel is configured to have a first operating mode to collect seaweed into the cavity and a second operating mode to discharge the seaweed collected in the cavity for sequestration. In the first mode of operation, the vessel is moved across the sea surface, such that water and floating seaweed pass into the cavity via the first opening. The second opening is provided with a filter, such that seawater is able to exit the cavity via the filter, but the seaweed is retained by the filter in the cavity. In the second mode of operation, the vessel is submerged to at least a transition depth at which the collected seaweed is compressed by water pressure to have a density greater than the sea density. The collected seaweed is then discharged from the cavity to sink to the sea bed for sequestration.

BRIEF DESCRIPTION OF THE FIGURES

Various implementations of the claimed invention will now be described by way of example only with reference to the following drawings.

FIGS. 3-5 are schematic diagrams from different views of an example of an electronics unit which may be fitted onto or integrated into the core structure of FIG. 2 in accordance with the present disclosure.

DETAILED DESCRIPTION

Figure 1:
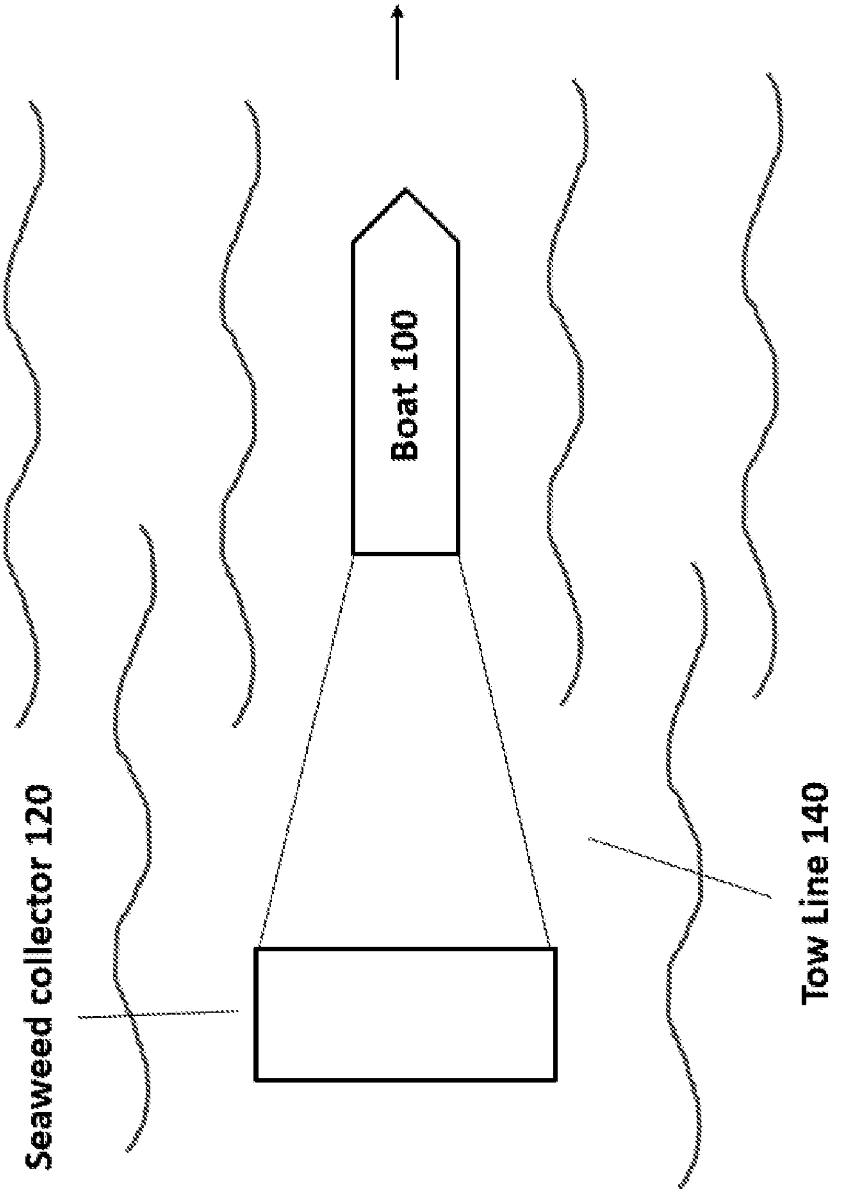
FIG. 1 is a schematic diagram of one example of collecting seaweed in accordance with the present disclosure.

The present disclosure relates to a vessel and method for carbon sequestration which involves sinking plant material, typically seaweed (macro algae), to the bottom of the sea. As seaweed grows, it photosynthesises, absorbing $CO_2$ from the sea water where it is growing, thereby allowing the sea water to absorb more $CO_2$ from the atmosphere. The sinking of seaweed such as sargassum to the deep ocean (below 1000 m) provides an approach for carbon removal that could scale to millions of tonnes of carbon dioxide.

This form of carbon sequestration has certain advantages over other forms of plant-based carbon sequestration such as growing a forest. For example, approximately 70 percent of the earth's surface is covered by water compared to just 30 percent covered by land, so intrinsically there is more space for storing carbon at sea than on land. In addition, the sea comprises not just a single surface but functions as a 3-dimensional space between the sea surface and the seabed. For example, the deep ocean (below 3000 m) makes up approximately 94% of the earth's biosphere. Accordingly, the overall capacity of the oceans is very much larger than that of land environments. In addition, whereas there are many existing forms of land use, such as agriculture, recreation, urbanisation, and so on, the use of the sea is much more limited in nature and extent. Moreover, such marine sequestration should not be affected by subsequent human activities or natural events (such as the deliberate or natural burning of a forest).

A further advantage of using the bottom of the sea for carbon sequestration relates to the irreversibility and verification (authentication) of the sequestration procedure. Thus a single event, namely sinking the seaweed (or other plant material), corresponds directly to the sequestration and is, for practical purposes, irreversible. In contrast, for forest growing there is no such single event corresponding to the sequestration, rather such sequestration depends on the ongoing life of the trees in the forest and is reversible, for example, if the forest is subsequently cut down and burnt for fuel. As described in more detail below, an authentication or verification procedure can be formulated around the single event for sea bed sequestration to provide confirmation of an irreversible sequestration that is not available (or only partly available) for other sequestration techniques.

Another advantage of using seaweed for carbon sequestration is that in certain parts of the world there has been a significant, and generally undesired, growth in the amount of seaweed. For example, the Caribbean Sea has recently seen a significant increase in the amount of sargassum, a naturally occurring, floating seaweed, thought to be due at least in part to excessive use of fertilisers on land, which then run off into rivers for discharge into the sea. This leads to an increasing level of sargassum (up to 20 million tonnes per year) being washed up onto the beaches of the Caribbean islands, Mexico and West Africa. The deposited seaweed can be unsightly and as the sargassum rots, large amounts of sulphur are produced which have a highly unpleasant smell. Accordingly, the increasing level of sargassum detracts from recreational activities on the beach, to the significant detriment of local economies which are reliant on tourism and fishing. Sargassum also has a high arsenic content so that if it is collected for waste disposal on land, this can result in contamination of soil or water resources. In addition, the growth in sargassum seaweed may also have other adverse consequences for the general marine environment, for example through the suffocation of reefs. Accordingly, the collection and safe disposal of such seaweed can be regarded as an ecological benefit in its own right (separate from, but additional to, the resulting sequestration of carbon).

The carbon sequestration procedure disclosed herein supports the removal of carbon dioxide from the atmosphere by allowing seaweed to accumulate carbon dioxide from the atmosphere (as part of the natural growth of the seaweed) and then sinking the seaweed for long-term storage on the sea bed. Note that the sequestration procedure itself typically generates a certain amount of carbon dioxide, for example by powering boats. The sequestration procedure disclosed herein has been developed so that the carbon dioxide generated as part of this procedure is significantly less than the carbon deposited on the seabed as part of the sequestration procedure.

The carbon sequestration disclosed herein utilises a machine or vessel to enable the collection and movement of large amounts of marine biomass, in particular macro algae (seaweed) in the seas and oceans. The vessel is able to use hydrodynamic forces to control its depth and position in the ocean, as well as the depth and position of the payload (seaweed) for sequestration. The vessel maybe configured approximately in the shape of a wing, whereby movement of water over the wing shape may be used to control the position and depth of the device in water. The vessel may be towed by another vessel as illustrated in FIG. 1 (see below) or it may be self-propelled. In the example shown in FIGS. 3-5 below, the vessel is powered by solar panels, however, other implementations may utilise wave and/or wind energy instead of (or in addition to) solar power.

Such a vessel may be used for the collection and deposit of floating macro algae, such as sargassum, into the deep ocean for the purposes of carbon sequestration. The vessel is designed to skim the sea surface in order to collect seaweed (or other biomass) within the body of the vessel. The back portion of the vessel is provided with netting so that water can flow through (and hence out of the vessel), but seaweed remains contained within the vessel.

When the vessel becomes full from the collected seaweed, the vessel may be adjusted so that the front of the vessel tilts down into the water. With this attitude, hydrodynamic forces from towing or propelling the vessel forwards through water cause the vessel to submerge into the water. At a depth of typically 200 m or more, the vessel may release its payload (the seaweed), such as by reversing sharply, opening one of the sides of the vessel, etc. Below the transition depth of approximately 150 m, the air bladders of seaweed (particularly brown algae such as sargassum) are compressed by the rising pressure so they become negatively buoyant, Accordingly, a seaweed payload released below the transition depth will sink to the bottom of the sea (rather than rise back up to the sea surface).

The vessel may be fitted with a wide array of sensors and data gathering apparatus, including video, which may be used for capturing evidence of the carbon sequestration and for other ocean monitoring. A variety of use cases are supported by this relatively wide, approximately wing-shaped vessel, which is able to collect and sink large payloads in the ocean.

FIG. 1 is a schematic diagram (not to scale) of one example of collecting seaweed in accordance with the present disclosure using a vessel such as described above as a seaweed collector 120. In some implementations, the collection is performed using a boat 100 to trawl across the sea surface. Behind (downstream of) the boat 100 is the seaweed collector 120 (a vessel) which is used to accumulate the seaweed. The seaweed collector 120 has an open end which faces towards the rear of the boat, and together the boat 100 and seaweed collector 120 can be considered as defining a longitudinal axis, with the boat 100 and seaweed collector 120 then both travelling forwards along this axis (towards the right hand side of FIG. 1 in the direction of the arrow). The seaweed collector 120 is attached to the boat 100 by a pair of tow lines 140. Each tow line 140 is connected at one end to the seaweed collector 120 and at the opposite end to the boat 100.

In operation, as the boat 100 progresses in a forward direction through the water, the tow lines 140 pull the seaweed collector 120 forwards (parallel to the longitudinal axis) in a form of trawling operation. In the above configuration, the surface water containing the seaweed generally flows into the open front end of the seaweed collector 120. The rear (tail) end of the seaweed collector 120, i.e. the end furthest from the boat 100, is provided with a filter which allows water to flow out of the rear end of the seaweed collector 120. The filter may be implemented, for example, as some form of netting or mesh which allows the exit of water from the rear end of the seaweed collector 120, but which retains seaweed in the seaweed collector 120 because the seaweed is unable to pass through the filter and hence unable to flow out of the seaweed collector 120.

Figure 2:
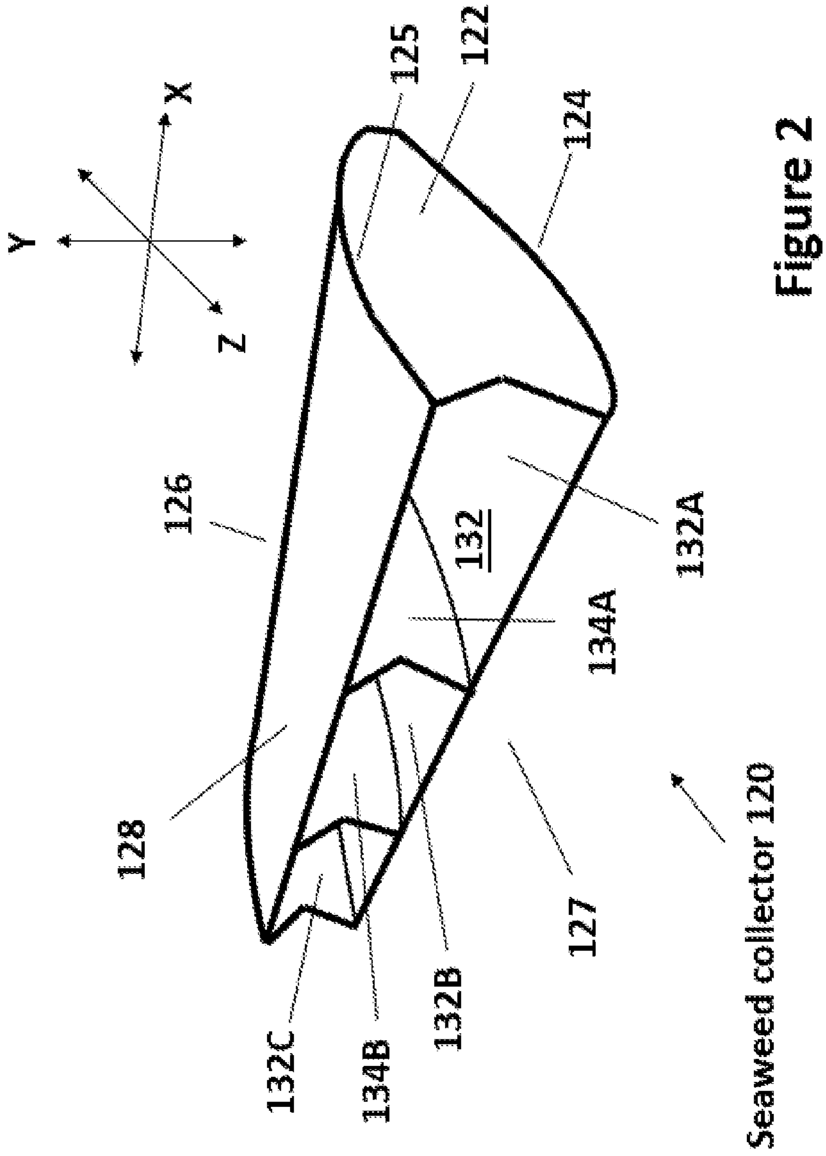
FIG. 2 is a schematic diagram of one example of a core structure of a seaweed collecting vessel in accordance with the present disclosure.

FIG. 2 is a schematic diagram of one example of a seaweed collector 120 in accordance with the present disclosure. In particular, FIG. 2 depicts the core structure of such a seaweed collector 120 to which further components may be added, as discussed below.

FIG. 2 further defines a set of orthogonal axes for use with describing the seaweed collector. The y-axis is defined to coincide with the vertical axis, with the top and bottom of the seaweed collector 120 then being understood accordingly. The top surface 128 of the seaweed collector is shown in FIG. 2, while the bottom surface, i.e. underneath the seaweed collector 120, is not explicitly visible in FIG. 2. The separation between the top surface 128 and the bottom surface corresponds to the height or depth direction.

The z-axis in FIG. 2 is defined to coincide with the longitudinal axis mentioned above, which extends in the forwards direction of motion of the seaweed collector when operating such as shown in FIG. 1 to collect seaweed. The front (leading) portion 127 and the back (rear or trailing) portion 126 of the seaweed collector are then understood as shown in FIG. 2. The separation between the front 127 and the rear 126 corresponds to the length direction.

Figure 3:
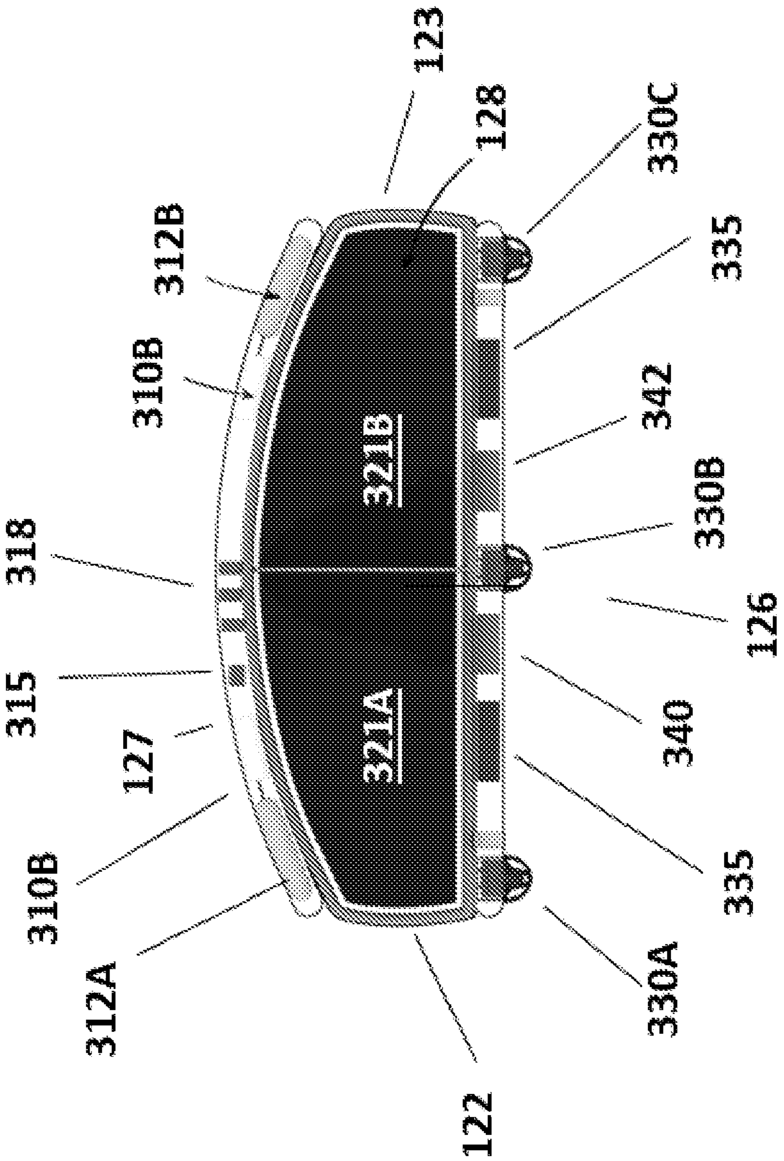

The x-axis in FIG. 2 is orthogonal to both the y and z axes, extending in a width direction from one side 122 of the seaweed collector 120 to an opposing side 123 (not explicitly visible in FIG. 2 but shown in FIG. 3). Side 122 corresponds to a left (port) side, based on a viewpoint that faces in the forward direction of the seaweed collector, with the opposing side 123 therefore corresponding to the right (starboard) side.

The seaweed collector 120 has a cavity 132 defined by the top surface 128 and bottom surface (floor), as well as the two opposing sides 122, 123, for retaining seaweed. In the example shown in FIG. 2, the cavity is divided by dividing walls 134A, 134B into separate chambers 132A, 132B and 132C. In particular, chamber 132A lies between side 122 and dividing wall 134A, chamber 132B lies between dividing wall 134A and dividing wall 134B, and chamber 132C lies between dividing wall 134B and the right-hand side 123 of the seaweed collector 120.

The front (mouth) of the cavity 132 is open to allow water and seaweed to flow into the cavity as the seaweed collector moves through water in a forward direction, such as shown in FIG. 1. The rear of cavity 132 is partly closed, in that water is able to escape from the rear of the cavity (and hence from the rear of the seaweed collector 120), but seaweed is retained in the cavity 132. The rear of the cavity can therefore be considered as a form of filter which may be implemented, for example, using a mesh, netting, grill or any other suitable filtering apparatus. In one example, the seaweed collector has a width of ~10 m, a length of ~4 m, and a maximum height of ~1.2 m, which gives an approximate capacity of 40 $m^3$ for the cavity 132 (assuming an average height of 1 m)—which in turn corresponds to approximately 40 tonnes (40,000 kg) of seaweed when full. It will be appreciated that these dimensions are provided by way of illustration only, and other implementations may have different dimensions according to the relevant circumstances. For example, the above figures might be taken as ±50%. In practice however, scaling up is likely to be more efficient than scaling down, e.g., if each batch of discharged (and then sequestered) seaweed had a mass of 20-500 tonnes.

The dividing walls 134A, 134B extend in a plane defined by the y and z axes. The dividers 134A may provide structural strength and rigidity for the seaweed collector against deformation, while providing little or no resistance to the collection of seaweed into the cavity 132, nor to the subsequent release/discharge of the seaweed from the cavity 132 (as described in more detail below).

The seaweed collector 120 has two main modes of operation. In a first mode of operation, as illustrated in FIG. 1 and referred to as a collection mode, the seaweed collector 120 travels along substantially at the surface of the sea to collect the seaweed. The seaweed is generally slightly less dense than seawater, and so floats on or close to the surface of the sea. For example, for a given piece of seaweed, one part might be floating on the surface of the water while the remainder might be extending down into the water. In some cases the floating seaweed may be wholly submerged, but remain close to the sea surface, e.g. within a couple of meters, for receiving light. During this first mode of operation, the top surface 128 of the seaweed collector may be located slightly above the sea surface for some or all of the time. Nevertheless, in general the majority of the seaweed collector 120 remains below the sea surface so that seaweed can be readily collected into the cavity 132 as the seaweed collector 120 progress in a forward direction.

In a second mode of operation, referred to as a discharge or release mode of operation, the seaweed collected during the first mode of operation is discharged to fall to the sea bed for sequestration. Although seaweed generally floats at or near the surface of the sea as noted above, if the seaweed is taken down below the sea surface, the water pressure on the seaweed increases. At a certain depth, referred to herein as the transition depth, the increased water pressure compresses the seaweed to such an extent that the seaweed becomes denser than the surrounding water. In this situation, the seaweed is then able to fall under its own weight to the bottom of the sea. Thus as mentioned above, seaweed such as sargassum and other brown algae has air pockets (bladders) which provide buoyancy to help the seaweed float. However, these air bladders become compressed by the enhanced pressure at increasing depths, so that below the transition depth of around 150 metres, the seaweed has negative buoyancy, and will therefore fall to the bottom of the seabed of its own accord. The transition depth is typically in the range 100-250 m (the exact depth may depend on factors such as the type of seaweed and the water temperature).

The sequestration locations are typically chosen as having a depth for the sea floor which corresponds to the aphotic zone, i.e at least 1000 m below sea level, and potentially much lower. At these depths, there is essentially no sunlight and very little oxygen available in the water, so any decay of the seaweed is very slow and there is very little formation and release of carbon dioxide. It is estimated that the carbon sequestration is typically effective for several hundred (if not thousands) of years if the batch of seaweed just sits on the sea bed. However, if the seaweed sinks into (or is covered by) sediment, then the sequestration may become effective on geological timescales, such as millions or tens of millions of years (akin to the duration of existing deposits of coal).

Accordingly, in the discharge mode, the seaweed collector is submerged in the sea to a depth corresponding to or greater than the transition depth. At this point, the seaweed is discharged from the cavity 132 to fall to the sea bed for sequestration. There are various ways of releasing the seaweed from the cavity 132. For example, one way is to rotate the seaweed collector about the x-axis to change the pitch or attitude of the seaweed collector 120 so that the front 127 of the seaweed collector (and hence the mouth of the cavity 132) lie substantially below the back 126 of the seaweed collector. In some cases, the release of the seaweed may involve a rotation of 90 degrees about the x-axis, so that the seaweed collector 120 has a vertical orientation with the front 127 directly below the rear 126 of the seaweed collector 120. In other cases, the rotation may be less than 90 degrees, so that the seaweed collector 120 has a slanted orientation which has a sufficiently steep slope down towards the front 127 for the seaweed again to fall out under its own weight. Once the seaweed has been discharged from the cavity 132, the seaweed collector can be returned to a pitch which is much closer to horizontal for travelling back up to the sea surface to return to the collection mode.

In another implementation of the discharge mode, the floor of the cavity 132 may open. For example, the floor of the cavity may be hinged along the front of the cavity and held shut by a catch at the rear of the cavity. When the catch is released, the floor falls (pivots) away to hang (typically vertically) from the front edge, thereby allowing the seaweed to fall out of the cavity 132 to the sea bed. The floor can then be rotated back into its original position and held there by closing the catch, thereby enabling the seaweed collector to return back to the sea surface to restart the collection mode.

It will be appreciated that although this implementation has the floor hinged along the front of the cavity (which provides hydrodynamic support for closing the floor as the vessel moves forwards), the hinging may be located at the back or side of the cavity (with the catch then suitably repositioned accordingly). In addition, the floor may comprise multiple sections, each of which might be individually opened and closed as described above. For example, each chamber 132A, 132B, 132C in the cavity 132 may be provided with a respective floor section that can be individually opened and closed to release the seaweed from the corresponding chamber.

The seaweed collector has an approximately wing-shaped profile or cross-section in the z-y plane, as reflected by the shape of top and bottom edges 125, 124 respectively, which define the shape of side 122. The wing-shaped profile is formed from two approximately planar surfaces which slightly converge towards one another approaching the trailing end of the seaweed collector, and which slightly diverge towards the front (leading) end of the seaweed collector, thereby creating an opening into cavity 132 for collecting seaweed.

This wing-shaped profile has various hydrodynamic benefits. The configuration with a wider front end and a tapering rear end helps to provide horizontal stability. For example, if the rear end of the seaweed collector starts to rise or fall slightly (away from the horizontal), water flowing around the front end towards the rear end will tend to push the rear end back into the horizontal position (pitch). The large, approximately horizontal surface area of the wing-shaped profile, including the significant width of the wing-span in the x-direction) helps to prevent roll (rotation about the z-axis). In addition, the divergence towards the front of the wing-shaped profile allows a relatively broad mouth of the cavity 132 to provide increased space for seaweed to enter the cavity as intake. The rear of the cavity 132 is able to be relatively narrow, in part because only the water has to exit the cavity here. Accordingly, the wing-shaped profile of the seaweed collector 120 is beneficial for both hydrodynamic reasons and also for functional reasons relating specifically to the collection of seaweed.

FIGS. 3-5 are schematic diagrams of an example of an electronics unit which may be fitted onto or integrated into the core structure of FIG. 2 in accordance with the present disclosure. The front 127, the back 126, the top surface 128 and the left 122 and right 123 sides of the electronics unit are labelled consistent with the labelling of the core structure of FIG. 2.

FIG. 3 is generally a view looking down onto the electronics unit, which in turn may be located at or on the top of the core structure. FIG. 4 is a view generally from the front left (and slightly above), while FIG. 5 is a view generally from back left (and above). Note that the electronics unit of FIGS. 3-5 generally supports independent operation of the seaweed collector, i.e. without the presence of boat 100. In some cases the seaweed collector 120 of FIGS. 3-5 may be subject to remote control by a human operator, in other cases the seaweed collector 120 may operate in an autonomous manner for some or all of the tasks performed by the seaweed collector.

The front 127 of the electronics unit shown in FIGS. 3-5 is curved across the width of the electronics unit, whereas the front 127 of the core structure in FIG. 2 is generally straight with respect to the width of the electronics unit. In some implementations the front of the core structure may be curved, or the front of the electronics unit straightened, to provide a match between the core structure and the electronics unit. However, other implementations may be formed based on the combination of the core structure shown in FIG. 2 with the electronics unit shown in FIGS. 3-5 without modification to the front of either.

The electronics unit of FIGS. 3-5 includes various electronic components, including solar panels 321A, 321B (collectively 321), tail fin 360, batteries 335, propellers 330A, 330B, 330C (collectively 330), control electronics (a control unit) 340, a global positioning system (GPS) receiver (or other such location device) 342, an imaging system 315, and sensors 318A, 318B, 318C (collectively 318). The electronics unit further includes compressed air cylinders 312A, 312B (collectively 312) and buoyancy chambers 310A, 310B (collectively 310). These components of the electronics unit are described in more detail below.

Although FIGS. 3-5 show the above components as part of the electronics unit, there are various ways in which these components may be provided in the vessel. For example, in some implementations, a central portion of the cavity, for example portion 132B (typically narrowed from the sizing shown in FIG. 2) may be used to house components such as the batteries 335, the control unit 340, the compressed air cylinders 312 and/or the buoyancy chambers 310. Many other configurations may be adopted for such components according to the particular circumstances of any given implementation.

As shown in FIGS. 3-5, the electronics unit is provided with a vertical tail fin 360 which extends in the y-z plane (i.e. perpendicular to the width of the seaweed collector 120). The vertical tail fin may help to provide stability in the forward motion of the seaweed collector (resisting yaw). In addition, during the first mode of operation, the vertical fin may provide visibility of the seaweed collector above the water surface (whereas the remainder of the seaweed collector may be largely below the surface and hence difficult to see). This enhanced visibility can therefore help to avoid accidental collisions with other marine users, such as boats.

In some cases, a structure similar to the tail fin 360 may be located on the underside of the seaweed collector 120. This structure may again be used to help stability, akin to a keel. A further possibility with reference to the core structure of FIG. 2 is that the dividing walls 134 may form a pair of tail fins (in addition to or as a replacement for tail fin 360). For example, the dividing walls 134 may have a height which is constant along the z-axis (length) of the core structure. Towards the rear 126 of the core structure, the top surface 128 is lower than at the front 127. Accordingly, the two dividing walls 134 of constant height may extend through and above this lower portion of the top surface 128 to act as two tail fins.

The two solar panels 321A, 321B are located on the top surface 128 of the seaweed collector. It will be appreciated that any given implementation may contain more, or fewer, solar panels. The solar panels 321 are used to provide power to the electronic components of the electronics unit. This power from the solar panels 321 may be stored first in re-chargeable batteries 335 located at the rear 126 of the seaweed collector, prior to supply of the power to the electronics components of the electronics unit.

In the first mode of operation (seaweed collecting), the solar panels are generally maintained at or very close to the surface of the seawater to allow the solar panels to receive visible light for conversion into electrical power. In the second mode of operation (discharge), which is usually performed at a significantly greater depth in the water (say 100-250 metres), the solar panels will generally not receive enough light energy to maintain operation. Accordingly, the electronics unit will normally rely on stored battery power from the batteries 335 during the second mode of operation.

The electronics unit further comprises a positioning system 342 which may be implemented using a receiver for a global satellite navigation system, such as GPS and/or Galileo, etc. Furthermore, some level of positioning information may be derived from other satellite constellations, such as Inmarsat. In some marine locations it is also possible to determine location at least in part from one or more terrestrial beacons and/or from mobile telephone (cellphone) base stations. GPS receiver 342 may therefore utilise any suitable space and/or terrestrial position location facility, and may include or combine results from multiple such facilities if appropriate.

It will be appreciated that the radio signals for such positioning systems generally do not penetrate under water. Accordingly, the GPS receiver 342 (or other positioning device) is generally maintained, like the solar panels 335, at or very close to the surface of the seawater during the first mode of operation, thereby allowing the GPS receiver to receive the radio positioning signals from the satellites.

The GPS receiver 342 may be provided in the electronics unit as a stand-alone system (typically with a data connection to the control unit 340); alternatively, the GPS receiver may be incorporated into another system. For example, some imaging systems, e.g. camera 315, may include a positioning facility, for example GPS, to obtain and save location information for acquired pictures or videos. Thus in some cases, the imaging system 315 may be used as (or to supplement) the GPS receiver 342.

The GPS receiver 342 may be used to support the first mode of operation (collection). For example, control unit 340 may download or be programmed with a particular course or area to perform the collection of seaweed. The control unit can then use the positioning information from the GPS receiver 342 to following the programmed course or to ensure that the seaweed collector 120 remains within the specified area. This type of functionality facilitates operation of the seaweed collector as a largely autonomous device with little requirement for human supervision. In addition, entering the second mode of operation (discharge) may be dependent on the seaweed collector being positioned at a given location or within a given area. This location or area can be selected and specified to ensure that the sea is deep enough to provide long-term sequestration of the discharged seaweed—for example, where the sea has a depth of 1000 m or more. Furthermore, the GPS receiver 342 (or other component such as the control unit 340) may provide a position (and time) for release of a batch of seaweed for sequestration from the cavity 132. This information is useful for providing a verification record (authentication) of the carbon sequestration, as discussed below in more detail.

(The GPS unit will generally not be able to track the position of the seaweed collector in the second mode of operation in which the seaweed collector dives down to the transition depth. In practice however, the seaweed collector will only travel a relatively small distance (compared to the size of the sea) from initiating the second mode until actual discharge of the seaweed, so that a GPS position obtained at the start of the second mode of operation remains a useful and reasonably accurate measurement of the location at which discharge occurred).

FIGS. 3-5 also show that the electronics unit comprises three propellers, 330A, 330B, 330C located at (and somewhat below) the rear 126 of the seaweed collector 120 to provide self-propulsion for the vessel 120. The propellers 330 are powered by the solar panels 321, either directly (when the solar panels are producing power), and/or by power from the batteries 335, which has previously been stored into the batteries 335 from the solar panels 321. The propellers 330 operate to drive the seaweed collector in a generally forward direction for both the first and second modes of operation. This then allows the seaweed connector to act in a standalone (autonomous) manner, without having an additional boat 100 as shown in FIG. 1 to pull the seaweed collector forwards through the water.

It will be appreciated that other implementations may have more or fewer propellers than the three shown in FIGS. 3-5. Furthermore in some implementations, the propellers may be omitted altogether, in which case a separate facility may be provided for moving the seaweed collector forwards through water—such as connecting the seaweed collector by tow lines 140 to a boat 100 which may be provided for this purpose (such as illustrated in FIG. 1).

In some cases, the thrust direction of one or more of the propellers 330 may be adjustable in a controlled manner to help manoeuvre the seaweed collector 120. For example, the direction in which a propeller is facing (and in particular the direction in water is discharged through the propeller) may be rotated about a vertical (y) axis (also termed the yaw axis) to steer the seaweed collector 120 to the left or right as appropriate. Note that left/right steering may also be implemented by adjusting the power (rather than direction) of the propellers. For example, if the left-hand propeller 330A is supplied with reduced, zero or negative (reverse) power, with the other two propellers providing normal forward thrust, then the seaweed collector will turn to the left as it moves forwards. Conversely, if the right-hand propeller 330A is supplied with reduced, zero or negative (reverse) power, then the seaweed collector will turn to the right as it moves forwards. The ability to provide reverse power to a propeller (to generate a backward thrust) may also allow the seaweed collector to move backwards, which provides additional manoeuvrability (and may also help with the discharge operation, see below).

Another possibility is to rotate the direction in which a propeller is facing (and in particular the direction in water is discharged through the propeller) about the x axis, parallel to the width/wing direction (also termed the pitch axis) to change the attitude of the seaweed collector 120. For example, upon transitioning from the first mode of operation to the second mode of operation, the front of the seaweed collector may be tilted down to submerge (dive) the seaweed collector 120, such as to go down to reach the transition depth to release the batch of seaweed in cavity 132. Alternatively, the front of the seaweed collector may be tilted up for the seaweed collector to be directed upwards, for example to return to the surface after a batch of seaweed has been discharged to transition back from the second mode of operation to the first mode of operation. (As used herein, a batch of seaweed represents the amount of seaweed released in a single discharge, and hence generally corresponds to the amount of seaweed that can be accommodated in the cavity 132.

The functionality of the propellers may also be used to facilitate release of the seaweed from the cavity 132. For example, the pitch control mentioned above might be used to tip (rotate) the front 127 of the seaweed collector so that it is facing directly downwards, thereby exploiting gravity to help the batch of collected seaweed to fall out from the cavity 132 for sinking to the bottom of the sea. Alternatively, or additionally, the discharge of seaweed from the cavity 132 may be facilitated by the propellers being able to create a backwards thrust—either by operating the propellers in a reverse direction, or by rotating the propellers 180 degrees about the x or y axis. This would result in a backwards motion of the seaweed collector, with water entering the cavity from the back 126 through the net or grill, and then flowing through the cavity 132 and out through the front 127 of the cavity 132. This reverse flow of water through the cavity 132 may help to discharge seaweed out of the cavity for sinking to the bottom of the sea.

Note that the propellers may combine multiple such operations to support a discharge of seaweed. For example, the seaweed collector 120 might be oriented with the front down and then operated with reverse thrust on the propellers to use both gravity and the reverse flow of water through the cavity 132 to perform the discharge of seaweed. In addition, different propellers 330A, 330B 330C may have different functionality from each other. For example. the power level from the left and right propellers 330A and 330C may be individually controllable to rotate the seaweed collector about the yaw (y) axis to steer the vessel left or right (as described above), while the central propeller may be able to rotate about the pitch (x) axis to control depth.

Various other functionality may be provided to support the discharge of seaweed from cavity 132. For example, the seaweed collector 120 may be vibrated to help seaweed fall out of the cavity. Such vibrations might potentially be provided by operating the propellers in a suitable manner (such as by rapidly alternating between forward and reverse thrust). In other cases, a motor or actuator may be fitted to the seaweed collector 120 specifically to provide such vibrations. The vibrations may also be produced by multiple components, for example, a motor and the propellers, working in conjunction with one another. Furthermore, the release of seaweed from cavity 132 may be performed using a combination of techniques, such as both tilting the front 127 of the seaweed detector downwards and also vibrating the seaweed detector.

In some cases the seaweed collector 120 may be provided with movable fins (not shown in FIGS. 3-5) to help manoeuvrability. For example, a horizontal fin might be provided on each side 122, 123 of the vessel. These horizontal fins might be rotated about the x-axis to control pitch. For example, the front (leading edge) of the fin may be tilted downwards to cause the seaweed collector to submerge for descent into the sea, while the rear (trailing edge) of the fin may be tilted upwards to cause the seaweed collector to travel upwards back to the sea surface.

The electronics unit shown in FIGS. 3-5 also includes two buoyancy (air) chambers 310A, 310B, each of which is linked to a respective compressed air supply 312A, 312B. The density of the seaweed collector can be controlled according to the amount of air provided to the buoyancy chamber. For example, if compressed air from supply 312A is released out into the deformable air chamber 310A, the air chamber 310A expands against the water pressure to accommodate the released air. The result is that the volume of the vessel 120 has increased while the weight (mass) of the vessel 120 has remained constant. Accordingly, the overall density of the vessel has decreased, thereby raising the buoyancy of the vessel in water.

In contrast, if air is vented into the sea from a buoyancy chamber 310, the buoyancy chamber 310 is compressed (deformed) inwards in response to the water pressure and the lower amount of air in the buoyancy chamber 310 to resist such compression. Thus in this situation, the volume of the vessel 120 is reduced, while the weight remains constant. Accordingly, the overall density of the vessel has increased, thereby reducing the buoyancy of the vessel in water.

The buoyancy of the seaweed collector 120 of FIGS. 3-5 may therefore be raised or lowered (to control the depth of the vessel) by adjusting the amount of air in the two buoyancy chambers, in particular by venting air in from an air supply 312 and venting air out into the ocean. It will be appreciated that although the seaweed collector 120 of FIGS. 3-5 has two buoyancy chambers and associated respective air supplies, the number of buoyancy chambers and/or air chambers may be increased or reduced as desired in any given implementation.

In one configuration, having the two air chambers 310 filled with air may provide positive buoyancy relative to seawater, so that the seaweed collector 120 generally rises to the surface, while having both chambers 310 largely emptied of air may provide negative buoyancy, so that the seaweed collector generally falls below the surface. In addition, intermediate amounts of air in the air chambers 310 may lead to an intermediate level of buoyancy, and hence might be used to obtain neutral buoyancy at a given depth.

It will be appreciated that in the configuration shown in FIGS. 3-5, the two air chambers 310A, 310B will typically be filled with the same amount of air to maintain a symmetric situation which may help to stabilise the vessel 120. However, other configurations could reduce any asymmetry arising from different levels of air fill in the two air chambers 310A, 310B—for example, if both buoyancy chambers were located very together in the central cavity portion 132A as mentioned above.

Accordingly, there are various options available for causing, controlling and steering movement of the seaweed collector 120 through the sea. Such options include, for example, multiple propellers controllable on an individual basis regarding status (on/off), power level, power direction (forward/back), and power orientation e.g. being able to rotate the direction of the axis of rotation of a propeller to provide different forms of manoeuvrability; the use of air chambers 310 and respective compressed air supplies 312 to (help) control depth; and the use of fins to control direction of motion.

As noted above, a further option is to provide one or more tow lines 140 from the seaweed collector to a boat 100 such as shown in FIG. 1 to provide motion of the seaweed collector 120. In this implementation, the seaweed collector would generally follow the left/right steering of boat 100. The pitch and hence depth of the seaweed collector might then be controlled using the buoyancy chambers 310, fins or any other suitable facility. A further possibility is that the seaweed collector 120 is connected to the boat 100 by a more complicated set of lines or ropes for controlling the pitch of the seaweed connector. Such control may be utilised to move the seaweed collector up or down in the water, i.e. to adjust the depth of the seaweed collector, and/or to turn the front edge 127 of the seaweed collector downwards to facilitate discharge of the seaweed from cavity 132 as described above.

The imaging system 315 may comprise one or more cameras for obtaining still pictures, time sequences of still pictures, and/or videos of the sequestration process described herein. In the first mode of operation (seaweed collection), the imaging system 315 might be used for controlling the movement and steering of the seaweed collector 120, especially if the seaweed collector 120 is generally being controlled remotely and/or autonomously. In the second mode of operation (discharge and sequestration), the imaging system 315 may provide a visual record and confirmation of the discharge of the seaweed and hence sequestration of the carbon. Note that the seaweed collector 120 may be provided with a light source (not shown in FIGS. 3-5) to provide illumination for imaging, especially with respect to the discharge operation (given the relatively small amount of sunshine that penetrates through to the transition depth).

The seaweed collector of FIGS. 3-5 is provided with three sensors, namely a depth sensor 118A, a salinity sensor 118B, and a $CO_2$ sensor 118C. The depth sensor may be implemented for example using a sonar system and may be used (inter alia) to measure the depth of the seaweed collector below the sea surface and also the height of the seaweed collector above the sea bed. The former measurement may be used to confirm that the seaweed collector is submerged to a sufficient depth (at or below the transition depth) for the density of the seaweed to exceed that of water, thereby enabling discharge of the seaweed from the cavity 132 in the vessel to sink to the seabed for sequestration. The latter measurement may be used to confirm that the current location is sufficiently deep to provide reliable seabed sequestration-typically about 1000 m or more below the sea surface. (It will be appreciated that the sea depth might also be determined using the GPS receiver 342 to determine position, and then looking up the sea depth for this position from nautical charts, etc).

The $CO_2$ sensor 118C provides useful information as part of longer term monitoring of the performance of the carbon sequestration process. For example, at the time of collecting (harvesting) the seaweed, the $CO_2$ concentration may be relatively low, because the seaweed has absorbed $CO_2$ from the seawater for photosynthesis. Subsequent to collection of the seaweed from the sea surface, the water may be monitored to see if the $CO_2$ level may start to rise, as the seawater absorbs $CO_2$ from the atmosphere to replenish the $CO_2$ lost to the seaweed.

The salinity sensor 118B measures the salinity of the sea water. This monitoring may again provide useful information as part of longer term monitoring of the performance of the carbon sequestration process. For example, the salinity may impact how quickly seaweed will regrow at this location following the collection process.

The control unit 340 is used to perform various monitoring, communication and control actions with respect to the seaweed collector 120. The control unity generally incorporates some form of computational device, including one or more processors for executing instructions which may be stored in the control unit (and/or downloaded to the control unit 340) and then loaded into memory for execution by the processor(s). The control unit generally also contains one or more communication facilities for communicating with the other components of the electronics unit and/or with an external party such as a remote operator. For example, the control unit 340 may have wired or wireless (e.g. Bluetooth) local connectivity to other electrical components on the vessel, and also long-distance (e.g. radio) connectivity with external parties.

The local connectivity may be used by the control unit 340 to monitor and collect information from the other electrical components in the vessel. Such information may be collected to support immediate or near-term operation of the vessel. For example, the control unit may use video from the imaging system 315 to control movement of the vessel (avoiding any obstacles, etc), or to confirm when the batch of seaweed in the cavity 132 has been discharged and is sinking towards the seabed, in which case the control unit may command the seaweed collector 120 to start the ascent from the transition depth back to the sea surface to collect further seaweed. As part of this command, the control unit may, for example, fill the buoyancy chambers 310 with air (rather than water) and/or control the propellers 330 to drive the vessel in an upwards direction. The collected information may also be subject to subsequent review and analysis as required—including the creation of a verification record for the carbon sequestration as described below.

As mentioned above, the seaweed collector may be operated using remote control. In this case, the human operator (who might be located on boat 100, or might be much further away, for example, on land) will receive pertinent information, such as the location and direction of motion of the vessel, and send control signals to command the vessel via the control unit 340, for example to move the vessel to a different region of sea which has more seaweed available. In other cases, the vessel is (largely) autonomous and acts robotically with self-propulsion to perform the first and second modes of operation in alternation. In such a configuration, a remote human might still provide general monitoring of the vessel to ensure that the vessel continues to behave as expected.

In practice, a continuum can therefore be seen between full remote control operation and full autonomous operation, whereby in progressing from the former to the latter, an increasing proportion of control operations are performed autonomously. This can be achieved, for example, by providing a vessel 120 with a machine learning (ML) artificial intelligence (AI) platform. There are various ML and/or AI platforms available, some relatively standardised, such as Tensorflow from Google, with other platforms being more specialised to a particular application area.

During a training phase in which a user performs full remote control, the ML/AI system is fed with information from the various sensors, such as a global positioning system (GPS) receiver (or other such location device) 342, imaging system 315, and sensors 318A, 318B, 318C (collectively 318) as discussed above, to provide data on the environmental situation of the vessel (including the internal state of the vessel). During the training phase, the ML/AI system is further supplied with details of the control commands provided by the user for operating the vessel through this environment. Over time, the ML/AI system learns which control commands should be performed in response to which environmental situations, and hence the ML/AI system can take increased (and potentially full) responsibility for controlling the vessel.

It will be appreciated that the training discussed above might only be performed on one or a small number of vessels, and the resulting trained ML/AI system can then be loaded (replicated) into other similar vessels (without those vessels having their own specific training or learning phase). The resulting ML/AI system may control multiple different aspects of the operation of vessel 120, such as the optimum speed and depth for accumulating seaweed, and/or when movement of the vessel indicates a rough sea, in which case the vessel might decide to reduce its speed through the water for collecting seaweed or possibly to submerge itself until the weather has improved.

It should be noted that a ML/AI control system may continue learning during an operational phase (after the training phase has terminated) based on recording/sensing the result of various operations. For example, the sensed data might indicate that recharging of solar cells is particularly effective at midday with the vessel travelling northwards so that the solar panels 321 tip slightly back southwards for increased exposure to sunlight. Accordingly, the AI/ML system might learn to adopt such a configuration when the batteries 335 are in need of recharging.

As previously noted, the control unit, and the seaweed collector in general, are unable to communicate with any external party when the vessel is submerged. In some implementations, there may in effect be a pair of electronic units, one of which is intended to remain on the sea surface, and the other of which submerges with the main vessel. The former might typically include some or all of the solar panels 321 and a communications facility for communicating with an external party as described above. The floating unit may then be linked by some form of electronic cable connection to the remaining electronic components which may submerge below the sea surface with the main body of the seaweed collector. The cable connection may be used to transfer communications and power between the pair of electronics units.

The control unit 340 may be used to track the sequestration events by generating a separate data record for each sequestration event, i.e. for each sinking of a batch of plant material. The data record may include video of the sequestration event, GPS information about the location of the sequestration event, depth information relating to the sequestration event, and so on. This data record may be used to support an audit process in respect of the carbon sequestration by tracking and authenticating the amount of carbon that has been sequestered by the event. For example, a company may want to fund (buy) a particular sequestration event to obtain a reliable and trackable amount of carbon offset. As another example, a state body may want to fund carbon sequestration in general to support net zero, and the details captured for specific seaweed sinking events can be used to demonstrate (measure) that a particular amount of carbon sequestration has indeed been performed.

Figure 6:
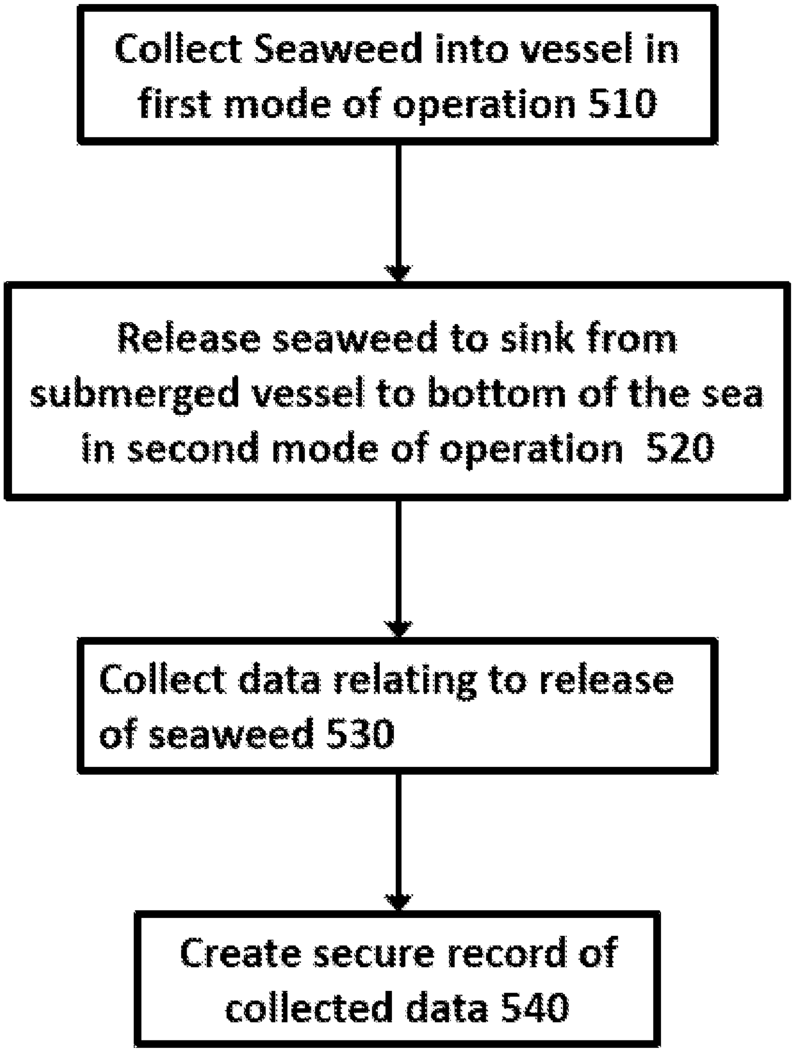
FIG. 6 is a schematic flowchart showing an example of a method for performing carbon sequestration in accordance with the present disclosure.

FIG. 6 is a flowchart illustrating one example of a method for carbon sequestration in accordance with the present disclosure. The method commences with collecting seaweed into a vessel at operation 510 in the first mode of operation. The procedure of FIG. 6 then progresses to operation 520 in the second mode of operation, in which the vessel is submerged and a batch of seaweed is released from the vessel to sink to the bottom of the sea. Note that in this context, references herein to the sea generally include the oceans or any other bodies of water which may be suitable for carbon sequestration. Sinking the batch of plant material to the bottom of the sea represents a carbon sequestration event.

In some implementations, operation 530 is now performed to collect data relating to the sequestration operation of 520 (hence at least part of operation 530 may run concurrently with operations 510 and 520, for example to perform a video recording of the carbon sequestration event). In some implementations, at operation 540, a verification data record is created for the carbon sequestration event. The data record serves as clear evidence that the carbon sequestration event has been performed, and also indicates the amount of carbon that has been sequestered. Such a verification data record may be used, for example, if a carbon offset process is audited to ensure that money spent on the offset reflects the sequestration of a particular amount of carbon.

The verification data record may hold collected data for one carbon sequestration event, so that each data record corresponds to a single respective carbon sequestration event. Another possibility is for the verification data record to correspond to multiple carbon sequestration events, for example as performed over a more prolonged period such as a day. In some cases, each verification data record may hold collected data for multiple events which in combination have sequestered a predetermined amount (mass) of carbon. This predetermined amount of carbon may correspond to (or define) a recognised unit of carbon offset; accordingly, a given number of units of carbon offset will be supported by the corresponding number of verification data records.

In some implementations, the verification data records created from a carbon sequestration process may be incorporated into a blockchain—e.g. each verification data record corresponds to a block to be appended onto the chain. Such a blockchain is a data structure which comprises a sequential set of data records (blocks). Operations on the blockchain are generally limited to appending new blocks to the end of the chain; editing or removal of blocks already accepted onto the chain is not permitted. More particularly, the data structure of the blockchain ensures that editing or removal of blocks already accepted onto the blockchain can be detected. This allows users of the blockchain to verify (authenticate) the blocks stored sequentially on the blockchain to confirm that they have not been subject to tampering or other modification.

The protection of the blockchain against modification is based on a hash function which is calculated with respect to the data held in a block. A hash function produces an output which depends on (and is usually much smaller than) the original data held in the block. The hash function is designed to be one-way, in that calculating the hash from the original data is relatively quick, whereas the reverse mapping from a hash value back to the original data is generally intractable (for practical purposes). Therefore any modification (e.g. corruption) of the data in a block can be detected because there is no longer a match between a stored hash determined from the original data and a hash newly created from the corrupted data.

An important aspect of blockchains relates to the control of how new blocks are appended onto the blockchain. In blockchains used to support crypto-currencies such as Bitcoin, the ordering of blocks to be newly appended to an existing blockchain typically relies upon different users performing a mining operation (a complex mathematical calculation). This is known as a Proof of Work strategy. The first user to complete the mining operation is rewarded with a unit of crypto-currency and this incentivises many users to perform the mining operation. However, the large-scale performance of mining operations in Proof of Work implementations is inefficient in terms of computational processing resource, since multiple users all perform the mining operation in parallel with one another until one user is successful. Having many users all involved in mining requires significant amounts of electrical power.

Accordingly, the blockchain used for holding the verification data records for the carbon sequestration may be based on a different approach for blockchain management, known as Proof of Authority, which does not use large-scale mining. In this approach, only known validators are permitted to add new blocks to the blockchain. In some implementations, there may be only a single validator, such as the party operating the carbon sequestration procedure, i.e. the party responsible for performing operations 520 and 530 in FIG. 6. In this situation, there is a just a single party which generates the data records for verification and then appends them to the blockchain. The public keys used by this single party for generating and appending blocks to the blockchain can be made available to third parties, thereby allowing third parties to confirm that the blocks were indeed created by the single party.

The blockchain provides proof of carbon removal (sequestration) because the blockchain provides a chain of ownership for each block (e.g. each $CO_2$ unit of offset) leading back to the provenance of the block, i.e. to the sequestration event corresponding to the block. In particular, the blockchain typically contains two types of blocks: a first type of block that represents the creation (performance) of a carbon sequestration event (this is sometimes referred to as a minting block by analogy with crypto-currency blockchains such as Bitcoin); and (ii) a second type of block that each represent a transfer of ownership of a first type of a block (where ownership of a first type of block reflects who owns the carbon offset associated with the first type of block). A user who receives a $CO_2$ offset unit, e.g. as per a transfer recorded in the second type of block, is able to click their way back to the published transaction (i.e. first type of block) that incorporated this $CO_2$ offset unit into the blockchain. The published transaction will include a link to the verification data record, such as a URL of a proof video for the sequestration, a hash to show that the block is both unique and hasn't been altered, and the reviewer that signed off on approval of the block.

The blockchain uses keys to ensure that at any given time there is only a single owner of each first type of block (and the carbon offset associated with that block). In other words, the blockchain prevents an owner of that block from transferring the block to more than one party, thereby ensuring there is no double-counting of carbon offset. In other words, the blockchain supports and in effect maintains accurate accounting of the carbon offset events, and this is underpinned by incorporating into the block the physical evidence (e.g. video) of the sequestration event that led to the generation of this carbon offset.

Although the use of a blockchain as described above provides an effective way of handling and storing verification data records from carbon sequestration events, other approaches are possible. As an example, a trusted party may maintain a database of verification data records from carbon sequestration events, including relevant video, etc. Again a hash (or some other form of digital certificate) may be used to demonstrate the integrity of the stored data record, and a digital signature may be provided to support provenance. The database may also track updated ownership of the block in terms of the carbon offset associated with the block.

Accordingly, an irreversible and verifiable carbon sequestration (carbon dioxide removal) based on creating and providing data records, e.g. in the form of a blockchain, may be performed to document and authenticate each sequestration event. This supports a more reliable development and adoption of carbon offset trading, which in turn facilitates increased carbon sequestration to help reduce atmospheric carbon dioxide.

Figure 7:
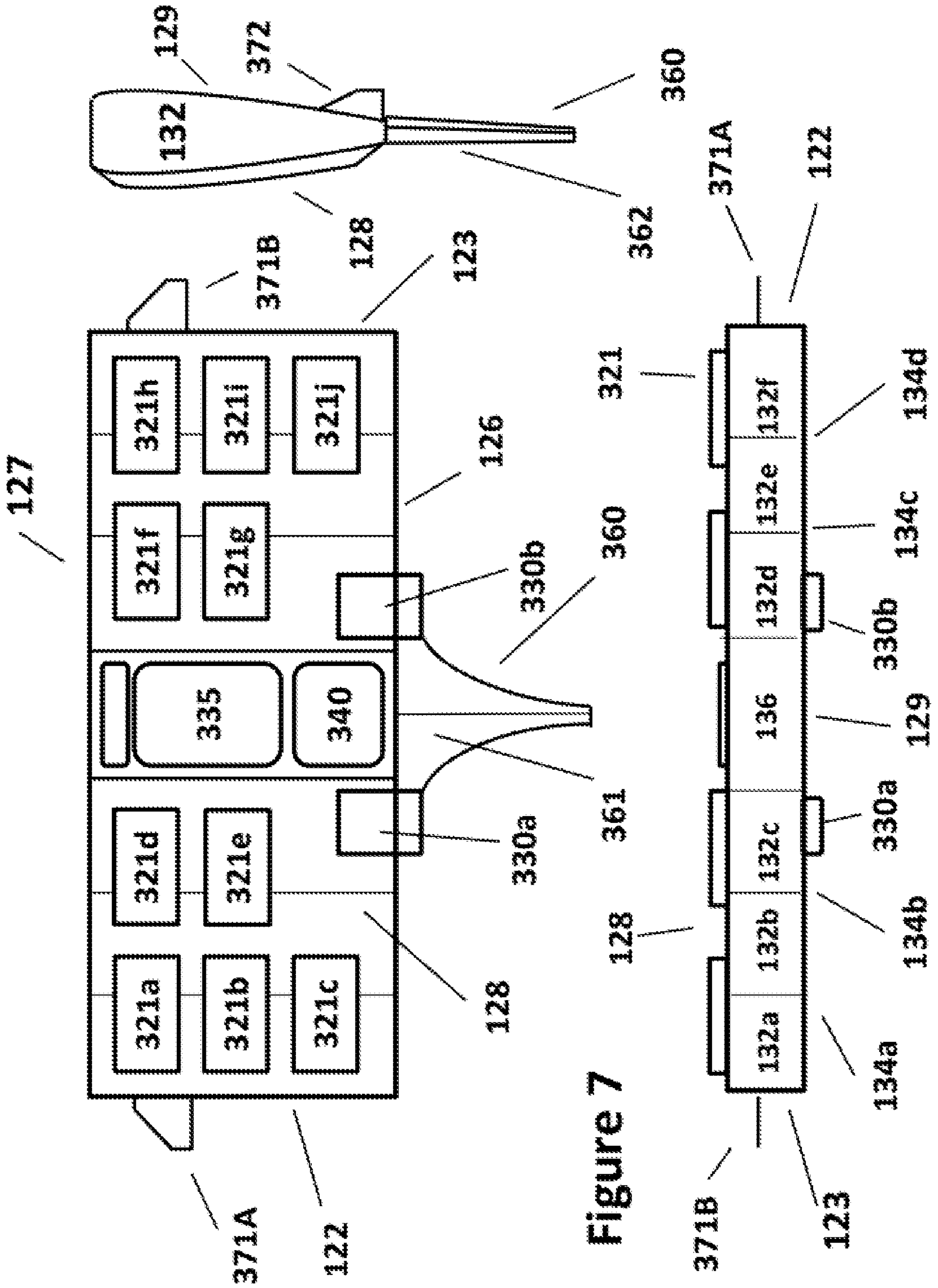
FIG. 7 is a schematic diagram showing different views of another example of a seaweed collecting vessel in according with the present disclosure.

FIG. 7 is a schematic diagram showing different views of another example of a seaweed collecting vessel in according with the present disclosure. In particular, FIG. 7 provides three views of such a vessel, namely the top right portion provides generally a view from the side, the top left portion provides a view from above, and the lower portion provides a view from the front. The reference numerals utilised for parts of the vessel 120 in FIG. 7 correspond to the reference numerals used for the same or similar parts shown in FIGS. 1-5. For example, vessel 120 includes top surface 128, front (leading) end 127 and rear (trailing) end 126, and left and right sides 122, 123. The vessel of FIG. 7 further includes a bottom surface 129 and a cavity 132 which is located between the top and bottom surfaces 128, 129. The cavity is separated into subcavities 132*a*, 132*b* . . . 132*f* by dividers, including dividers 134*a*, 134*b*, 134*c* and 134*d*.

As described above, the cavity (comprising the subcavities 132*a* . . . 132*f*) is used to collect seaweed. In particular, water enters through the openings at the front 127 of the vessel and then passes out through a filter (e.g. grill or mesh) at the rear 126 of the vessel. In this configuration, seaweed is drawn into the cavity with the water through the front opening, but is unable to leave the cavity with the water due to the filter. Instead, the seaweed is collected within the cavity 132 for subsequent sinking and sequestration. By way of example, the total capacity of cavity 132 (as provided by the subcavities 132*a* . . . 132*f*) may be of the order of 20 $m^3$, but more generally may be in the range 5-250 $m^3$, or in the range 10-150 $m^3$.

The central portion of the space between the top and lower surfaces, namely the space between sub-cavities 132*c* and 132*d*, is not used in this particular example for collecting seaweed but rather provides a housing 136 for various operational components of the vessel 120. This housing 136 may be closed at the front (unlike the subcavities which are open) to protect the components therein from sea water. The housing 136 contains re-chargeable battery (or batteries) 335 and control and communications electronics 340. The functionality of the control and communications electronics 340 is generally the same as described above, for example with reference to FIGS. 1-5. The vessel may also be equipped with various sensors (not shown in FIG. 7), for example a global positioning system (GPS) receiver, an imaging system, and other environmental sensors, again as described above with reference to FIGS. 1-5. The housing may further comprise at least one air chamber and at least one air supply for controlling buoyancy, again as described above with reference to FIGS. 1-5.

The vessel 120 is provided with two electronic drive modules 330A and 330B which are located beneath (or potentially in) subcavities 132*c* and 132*d* respectively and are used to provide self-propulsion for the vessel 120. These drive units are powered by one or more batteries 335 and/or solar panels 321. The vessel 120 may be steered to the left (port) or right (starboard) as desired by setting the drive modules 330A, 330B to have different power outputs from one another. As previously described with reference to FIGS. 1-5, the solar panels 321*a*-321*j* are provided on top of the vessel 120 and are used to provide power to operate the electrical/electronic components of the vessel. The one or more rechargeable batteries 335 store power from the solar panels, for example to provide power to the vessel at night or in other low-light conditions.

The vessel 120 is provided with a tail 360 at the rear of the vessel. The tail is formed of two orthogonal plates, namely a horizontal plate 361 (in the x-z plane) and a vertical plate 362 (in the y-z plane), each of which acts as a stabiliser for the vessel. In some implementations, the tail may also be fitted with a steerable rudder 372 for controlling the left/right (port/starboard) direction of travel of the vessel. In addition, the vessel is provided on each side with a dynamic fin 371A, 371B (collectively 371). The fins are dynamic in that their angle of attach in the forward direction can be adjusted (in effect, rotating the fins 371 around the x-axis). Controlling the fins in this manner can be used to direct the motion of the vessel in an upwards or downwards direction as desired (according to the set angle of attack). In addition, setting the fins 371A, 371B to have a slight different angle of attack from one another may also be used for left/right steering of the vessel.

The approach described herein therefore provides a method and vessel for the collection and sinking of seaweed which may be performed with no need to remove the seaweed from the water. The vessel may be remotely operated or be fully autonomous. The vessel has an approximately wing-shaped structure with a large surface area that can be used to support solar panels for providing power to the vessel. The vessel is able to operate both on the surface for collecting seaweed, and also deeper in the water for discharging seaweed at a depth at which the seaweed will then sink under its own weight. Typically therefore, the vessel can submerge to around 200 m to deposit the seaweed for carbon sequestration, and/or be used near or at the surface to collect seaweed and also to receive sunlight for (re)charging solar panels. The vessel may also submerge itself in water in the case of bad weather to a sufficient depth to largely avoid storms and large waves.

Although the vessel described herein may primarily be used for seaweed collection and sequestration, it may also find use in other areas. For example, in the case of seaweed farming, the vessel might be used to tow a rig for growing seaweed to a suitable location for the seaweed to grow, and subsequently return the rig to allow the grown seaweed to be harvested.

In conclusion, while various implementations and examples have been described herein, they are provided by way of illustration, and many potential modifications will be apparent to the skilled person having regard to the specifics of any given implementation. Accordingly, the scope of the present case should be determined from the appended claims and their equivalents.

What is claimed is:

1. A vessel for sequestering carbon, the vessel defining a cavity associated with a first opening and a second opening, the vessel being configured to:

in a first mode of operation to collect seaweed into the cavity, move the vessel across the sea surface, such that water and floating seaweed pass into the cavity via the first opening, wherein the second opening is provided with a filter, such that seawater is able to exit the cavity via the filter, but the seaweed is retained by the filter in the cavity;

in a second mode of operation to discharge the seaweed collected in the cavity, submerge the vessel to at least a transition depth at which the collected seaweed is compressed by water pressure to have a density greater than the sea density, and release the collected seaweed from the cavity to sink to the seabed for sequestration; and wherein the vessel is approximately shaped as a wing.

2. The vessel of claim 1, wherein the first mode of operation to collect seaweed and the second mode of operation to discharge the collected seaweed are completed without the seaweed leaving the sea.

3. The vessel of claim 1, wherein the filter comprises a grill or net across the second opening.

4. The vessel of claim 1, wherein the length of the wing defined in the direction of intended forward travel of the vessel is greater than the height of the wing defined in the vertical direction, and less than the width of the wing.

5. The vessel of claim 1, wherein the wing has a leading portion which comprises the first opening into the cavity.

6. The vessel of claim 1, the vessel comprising one or more solar panels for providing electrical power to the vessel.

7. The vessel of claim 1, the vessel comprising one or more propellers or drive motors for self-propulsion.

8. The vessel of claim 1, wherein the vessel includes at least one buoyancy chamber and the vessel is configured to fill the at least one buoyancy chamber with water or gas to control the buoyancy of the vessel.

9. The vessel of claim 1, wherein the transition depth is more than 100 m, optionally more than 150 m, and optionally more than 200 m.

10. The vessel of claim 1, wherein the vessel has a width of 10 m and a length of 4 m, both measurements being ±50%, and/or wherein the mass of seaweed for each batch is 40 tonnes ±50%.

11. The vessel of claim 1, wherein the vessel is configured to perform at least one of: (i) vibrating the vessel; (ii) operating the vessel in reverse mode; and/or (iii) tilting the vessel so that the first opening faces downwards; in order to assist in discharging the seaweed from the cavity.

12. The vessel of claim 1, wherein the vessel comprises an imaging system to obtain imaging of the discharge and sinking of a batch of seaweed from the vessel.

13. The vessel of claim 12, further comprising a control system for creating a verification data record of a carbon sequestration event comprising the discharge and sinking of a batch of seaweed from the vessel, the verification data record including the imaging, time and location of the carbon sequestration event, optionally wherein the control system is configured to form a blockchain from the verification data records, wherein each block of the blockchain corresponds to one or more carbon sequestration events.

14. The vessel of any of claim 12, wherein the imaging system and the control system are used to support remote operation and/or autonomous operation of the vessel, preferably where the autonomous operation is provided using a trained machine learning/artificial intelligence system.

15. The vessel of claim 1, wherein the cavity is formed internally within the wing.

16. The vessel of claim 15, wherein the cavity is located between an upper surface of the wing and a lower surface of the wing.

17. The vessel of claim 16, wherein the upper and lower surfaces of the wing are approximately planar and converge towards a trailing portion of the wing.

18. The vessel of claim 17, wherein the second opening is formed in the trailing portion of the wing.

19. A method for operating a vessel to sequester carbon, the vessel defining a cavity associated with a first opening and a second opening, the method comprising:

in a first mode of operation, collecting seaweed into the cavity by moving the vessel across the sea surface, such that water and floating seaweed pass into the cavity via the first opening, wherein the second opening is provided with a filter, such that seawater is able to exit the cavity via the filter, but the seaweed is retained by the filter in the cavity;

in a second mode of operation, discharging the seaweed collected in the cavity by submerging the vessel to at least a transition depth at which the collected seaweed is compressed by water pressure to have a density greater than the sea density, and releasing the collected seaweed from the cavity to sink to the seabed for sequestration; and wherein the vessel is approximately shaped as a wing.

* * * * *